March 2, 1937.  L. J. HENGESBACH ET AL  2,072,555
FAUCET
Filed June 24, 1935
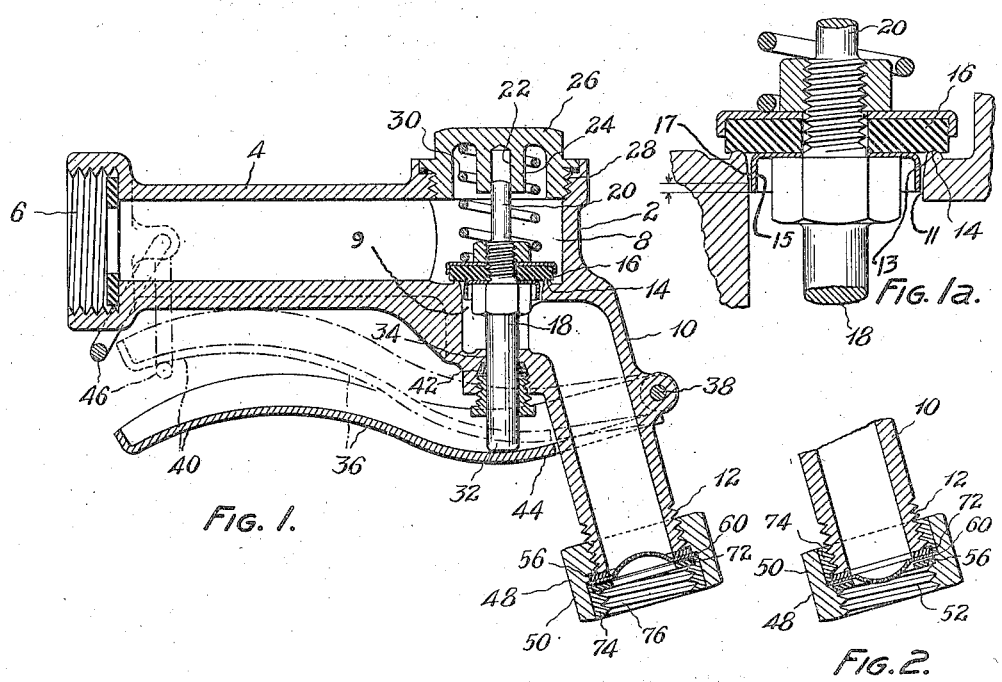
Fig. 1.
Fig. 1a.
Fig. 2.
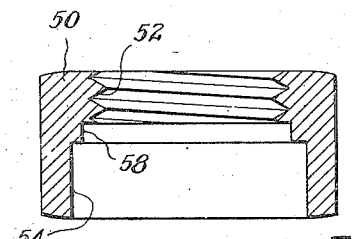
Fig. 5.
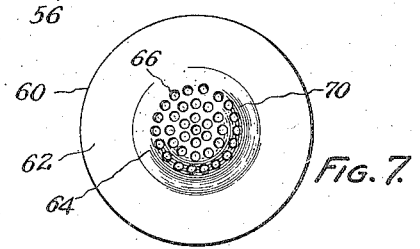
Fig. 7.
Fig. 6.
Fig. 8.
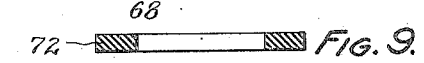
Fig. 9.
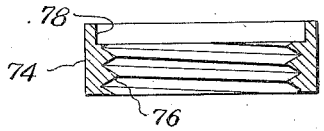
Fig. 10.
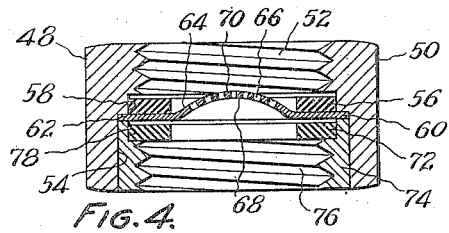
Fig. 3.
Fig. 4.
INVENTORS:
LEO J. HENGESBACH
WILLIAM P. FOX
BY Bayrell and Wesseler
ATTORNEYS Patented Mar. 2, 1937

2,072,555

UNITED STATES PATENT OFFICE 2,072,555

FAUCET

Leo J. Hengesbach, Cleveland Heights, and William P. Fox, Shaker Heights, Ohio, assignors to Frederick H. Zulauf, East Cleveland, Ohio Application June 24, 1935, Serial No. 28,190

13 Claims. (Cl. 122—144)

Our invention relates to a faucet and more particularly to a faucet having a manually operable valve to control the flow of liquids and having means to control the character of the outflowing stream. This faucet is primarily intended for use at the end of a hose and is particularly useful in connection with the washing of automobiles and with the filling of the radiators and fuel tanks thereof. When used for washing purposes, the faucet or the stream controlling means may be provided with a brush and mop. In general, this faucet is intended for use with any conduit in connection with which it is desirable readily to control the flow of liquid at the outlet end of the conduit, especially if it is also desirable to change the character of the outflowing stream.

Our invention also relates to a method of changing the character of the stream discharged by the faucet. This method involves the use of a nozzle element and the reversing of this nozzle element relative to the outlet of the faucet to alter the character of the discharged stream. More particularly, the discharged stream is concentrated, or is spread out as a spray, by reversing the nozzle element.

A principal object of our invention is to provide a valve having flow-control means which effect a smooth readily controlled increase or decrease in the liquid flow through the faucet, said means being operative particularly during the initial and final stages, respectively, in opening and closing the valve, whereby the outflow may be smoothly started and regulated from a mere trickle to full flow.

Another object of our invention is to provide a simple nozzle element which in one position will concentrate the outflowing stream and in another position will spread the outflow so as to form a spray, the nozzle element being readily changeable from one position to the other while the liquid flow is stopped by means of the manually operable valve forming part of the faucet, whereby the character of the stream may be readily changed while the faucet remains in position on a conduit. Preferably, this nozzle element is carried in a fitting attachable to the outlet of the faucet and comprises a plate having a perforated dished portion which, when placed so that its convex surface is presented to the outflowing liquid, concentrates the stream and, when placed so that its concave surface is presented to the outflowing liquid, spreads the stream.

Another object of our invention is to provide a faucet which may be simply and economically manufactured, for example, by die-casting. In order that this may be done advantageously, the body of the faucet is formed with openings which have plain surfaces to facilitate manufacture and one of which with its closure provides for ready assembly and disassembly of the valve in the body.

Other and further objects of our invention will become apparent from the present disclosure thereof and from the claims, it being understood that the following description and accompanying drawing refer to a preferred form of the invention.

The invention is illustrated in the accompanying drawing, in which like characters indicate like parts in the several views and in which:—

Fig. 1 is a longitudinal section through a faucet constructed according to our invention and having a nozzle fitting arranged to concentrate the outflowing liquid stream;

Fig. 1a is an enlarged fragmentary sectional view of the valve provided in the faucet and shown in Fig. 1;

Fig. 2 is a fragmentary longitudinal section showing the nozzle fitting arranged on the faucet so as to spread or spray the outflowing liquid stream;

Fig. 3 is an end view of the nozzle fitting shown in Fig. 4 and as seen when looking toward the convex surface of the perforated plate;

Fig. 4 is an enlarged longitudinal section of the nozzle fitting shown in Figs. 1 and 2;

Figs. 5, 6, 8, 9, and 10 are sectional views of various elements forming parts of the nozzle fitting; and Fig. 7 is a plan view of a perforated plate shown in section in Fig. 8.

Referring to Fig. 1 of the drawing, our faucet comprises a casing 2 having an inlet portion 4 formed with a straight passage and internally threaded at its inlet end 6, a valve chamber 8 at the other end of inlet portion 4 and substantially perpendicular to the passage therein, a tubular passage 9 extending from valve chamber 8 and formed with an internally cylindrical surface 11 and tapered surface 13, and an outlet portion 10 which is formed with a straight passage communicating with passage 9 and which is externally threaded at its outlet end 12. An annular valve seat 14 is formed at an end of tubular passage 9 and a valve head 16 mounted on a stem 18 is movable toward and from the seat to control the flow of liquid through the faucet. Further control of the flow, particularly during the opening and closing movements of valve head 16, is provided by a flow-control element 15, shown in Figs. 1 and 1a as a cup-washer carried by stem 18 and having an externally cylindrical surface 17 which cooperates with the cylindrical and tapered surfaces 11 and 13. Cylindrical surface 17 is positioned within surfaces 11 and 13 so that, when valve head 16 is in closed position, it overlaps cylindrical surface 11 to the extent shown by the space between the two arrows in Fig. 1a. The external cylindrical surface 17 is made slightly smaller in diameter than the internal cylindrical surface 11, about 0.0025 inch, so that, when opening of valve head 16 is begun, only a trickle of fluid will flow between surfaces 17 and 11. As the opening movement of valve head 16 is extended, plunger 15 moves with it and cylindrical surface 17 moves by tapered surface 13 to provide a fluid-flow passage which increases in size more gradually than the opening between valve head 16 and seat 14 until surface 17 entirely clears tapered surface 13. By this construction jerking of the valve is avoided in opening the valve when the faucet is connected to high-pressure water systems. Stem 18 extends longitudinally through valve chamber 8 and through passage 9 and an end portion 20 thereof slidably engages guideway 22 formed in an inwardly extending boss 24 on valve cap 26, which is threadedly secured to, and closes an opening 28 provided in, casing 2 for ready assembling and disassembling of the valve in the casing. A coil spring 30 surrounds boss 24 and stem 18 and bears at one end against cap 26 and at its other end against valve head 16, which is thereby held resiliently against valve seat 14.

In order to provide for actuation of the valve, the stem has an end portion 32 extending through an opening 34 in the casing and engageable by a lever 36, which is pivoted to the casing, as at 38, and which has a handle portion 40 extending beyond end portion 32. A packing 42 of any suitable type may be used to prevent leakage between end portion 32 and opening 34. At its pivoted end, lever 36 is formed in the shape of a U, the sides of which fit loosely about discharge or outlet portion 10 of the casing and are pivoted thereto at 38 and the base 44 of which is adapted to engage casing portion 10, in the outer position of the lever 36, so as to prevent the lever from falling away from inlet portion 4 of the casing. Handle portion 40 of lever 36 is adapted to be engaged by a loop 46, pivoted to casing inlet portion 4, in order to hold the valve in open position, as shown in dotted lines in Fig. 1.

A nozzle fitting 48 is adapted to be threadedly engaged on casing outlet portion 10 in either of two relatively reversible positions, as shown in Figs. 1 and 2. The fitting 48 comprises a tubular member 50 having an internally threaded portion 52 at one end and a recessed portion 54 at its other end, a packing element or washer 56 fitting in the intermediate portion 58 of tubular member 50, a perforated plate 60 having one side of its rim portion 62 lying against washer 56, a second packing element or washer 72 lying against the other side of rim portion 62, and an annular element 74 secured in recessed portion 54 of the tubular member in any manner which is suitable and effective to keep the various elements of the nozzle fitting in assembled position, as shown in Fig. 4, this element 74 being internally threaded at its outer end portion 76 and having an inner end recessed portion 78 which receives washer 72. The plate 60 has a plane rim portion 62 and a dished central portion 64 provided with perforations 66, the axes of which converge substantially toward the center of curvature of the dished portion, the perforations 66 being arranged so that the liquid discharged therethrough does not strike the washer or internal threads toward the discharge end of the nozzle fitting. The fitting 48 is assembled by inserting into element 50 first washer 56, then plate 60, then washer 72, and finally element 74, which may be secured to recessed portion 54 by a press-fit. When element 74 is permanently secured to recessed portion 54, washers 56 and 72 are fitted on rim 62 of plate 60 with a slight clearance in order to facilitate replacement of deteriorated washers without disassembling the parts 50 and 74.

The essential feature of the nozzle element is the reversibility of plate 60, relative to the outlet portion of the faucet, to concentrate or to spread out the outflowing stream. In order to concentrate the stream, the dished-in or concave surface 68 of plate 60 is positioned so as to face outwardly, as shown in Fig. 1, and in order to spread the stream as a spray, the dished-out or convex surface 70 of plate 60 is placed so as to face outwardly. In the particular form of the invention illustrated in the drawing, reversal of dished portion 64 is attained by fixing plate 60 in the nozzle fitting and by reversing the nozzle fitting end for end on the threaded outlet end 12 of the faucet. It is obvious, however, that this reversal may be effected otherwise, for example, by fitting plate 60 in a nozzle fitting in a readily removable manner so that plate 60 may be reversed in the nozzle fitting.

As is apparent in Figs. 1, 5, and 10, casing 2, tubular member 50 and element 74 are formed mainly with cylindrical interior surfaces and hence may be made readily by simple relatively inexpensive operations, as by die-casting, and require a minimum of relatively expensive finishing operations, as machining. Plate 60 may be readily stamped out, as is apparent from Fig. 8. Our faucet and nozzle fitting, therefore, may be manufactured very economically and rapidly and their construction is very simple with practically no parts which may become defective. The valve in the faucet may be readily disassembled for cleaning and replacing packing or washers and then may be readily reassembled. The nozzle fitting obviously may be easily cleaned if it becomes clogged by impurities in the water or other liquid which passes through it. If the nozzle fitting is made with element 74 permanently assembled in recessed portion 54, either of packing washers 56 and 72 may be readily replaced when necessary, the deteriorated washer being pulled out and a new washer being inserted by compressing it into a bowl-like shape whereby its outer diameter is reduced and it may be inserted within the nozzle fitting until it is contiguous to the plate 60, whereupon the washer will expand into operative position upon rim 62 of the plate 60.

Our faucet and nozzle fitting are particularly useful for filling automobile radiators and for washing automobiles. When it is desired to fill a radiator, the nozzle fitting may be placed on the faucet outlet so as to concentrate the outflowing stream, which is readily and smoothly regulated by the valve shown in Figs. 1 and 1a so as to eliminate spilling and splashing. The same is true when our faucet and nozzle fitting are used for other filling purposes, as for filling automobile tanks with fuel. For washing an automobile, the nozzle fitting may be placed on the faucet outlet so as to spray gently the finished surfaces of the body without injury thereto, and may also be readily reversed so as to concentrate the outflowing stream on parts of the automobile which require a forceful stream to be cleaned, such as parts of the chassis. Control of the outflow is easily accomplished by reason of the gradual starting of the flow and the convenient handling, casing portion 4 and valve handle portion 40 forming a single handle to be held in one hand and the valve being easily and smoothly controlled by varying the grasping pressure of the hand.

We claim:

1. In combination, a faucet having a manually operable valve and a nozzle fitting reversibly attached to the outlet of the valve, said valve including relatively movable flow-control elements forming two flow passages in series relation, one of said passages being adapted to be closed and opened relatively quickly by said movable elements, the other passage permitting only slight flow when opening of the valve is begun and increasing in size more gradually than the first-mentioned passage during further opening of the valve, and said nozzle fitting being adapted, by reversing it relative to said outlet, to concentrate or spray the outflow.

2. In combination with a faucet having a manually operable valve and an outlet, a reversible nozzle fitting comprising a tubular member removably attached to said outlet in axial alinement therewith, and a centrally dished perforated plate in said tubular member, the dished-in surface of said plate, when facing outwardly, and the perforations in said plate being so formed and arranged as to concentrate a liquid stream when discharged from the faucet through the fitting.

3. In combination with a faucet having a manually operable valve and an outlet, a reversible nozzle fitting comprising a tubular member removably attached at one of its ends to said outlet in axial alinement therewith, and a centrally dished plate fixed in said tubular member, the dished portion of said plate being formed with perforations and each end of said tubular member being similarly formed whereby said tubular member may be attached at either of its ends to said outlet.

4. In combination with a conduit, a nozzle fitting comprising a plate formed with a perforated centrally dished portion, a tubular member attached to said conduit and receiving said plate, and an annular member securing said plate in said tubular member, said tubular and annular members being adapted to hold said perforated dished portion in axial alinement with said conduit and with either its dished-in or its dished-out surface facing outwardly, and the perforations in said dished portion being so formed and arranged as to concentrate the liquid stream discharged through the fitting when the dished-in surface of said dished portion faces outwardly and to spray the discharged stream when the dished-out surface faces outwardly.

5. In combination with a conduit having connecting means, a nozzle fitting having connecting means at each of its ends and complementary to the first-mentioned connecting means, said nozzle fitting including between its ends a perforated dished plate adapted to concentrate the outflowing stream when one end of the nozzle fitting is connected to the conduit and to spray the outflowing stream when the other end of the nozzle fitting is connected to the conduit.

6. A nozzle fitting comprising a tubular member formed at each end with means for attaching said tubular member to a conduit, and a plate secured in said tubular member between the ends thereof, said plate having a perforated centrally dished portion.

7. A nozzle fitting comprising a tubular member internally threaded at each end, a perforated dished plate, and means securing said plate within said tubular member between the ends thereof.

8. A nozzle fitting comprising a tubular member having means at one end for attaching the fitting to a conduit, an annular member secured at the other end of said tubular member and also having means for attaching the fitting to a conduit, a perforated dished plate in said tubular member between the ends thereof, and annular packing elements engaging said plate.

9. A nozzle fitting comprising a tubular member internally threaded at one end and formed with a recess at its other end, an annular member secured in said recess and internally threaded similarly to the first-mentioned end of said tubular member, a plate having a rim and a perforated centrally dished portion, an annular packing element located between the threads on said tubular member and said rim and engaging one face of said rim, and a second annular packing element located between the threads on said annular member and the rim and engaging the other face of said rim.

10. A nozzle fitting adapted to be attached to the outlet of a faucet having a manually operable valve, said fitting comprising a perforated centrally dished plate and means for attaching said plate to said outlet with either its dished-in or its dished-out surface facing outwardly.

11. A nozzle fitting adapted to be attached to a conduit, said fitting comprising a plate having a centrally dished perforated portion and means for attaching said plate to said conduit so that said centrally dished perforated portion is in axial alinement with said conduit and so that the dished-in surface of said portion faces outwardly.

12. A method of changing the character of a stream discharged from a conduit outlet having a dished perforated nozzle plate in axial alinement with said outlet, which method comprises reversing the position of the dished surfaces of said plate relative to said outlet.

13. A method of changing the character of a stream discharged from a faucet having a manually operable valve, an outlet, and a nozzle fitting including a dished perforated plate in axial alinement with said outlet, which method comprises reversing the position of the nozzle fitting while the faucet valve is closed, so as to reverse the position of the dished surfaces of said plate relative to said outlet.

LEO J. HENGESBACH.
WILLIAM P. FOX.